United States Patent [19]

Kawano

[11] Patent Number: 5,036,345
[45] Date of Patent: Jul. 30, 1991

[54] CAMERA PROVIDED WITH A STROBE

[75] Inventor: Kiyoshi Kawano, Rochester, N.Y.

[73] Assignee: Asahi Kogaku Kogyo Kabushiki Kaisha, Tokyo, Japan

[21] Appl. No.: 497,919

[22] Filed: Mar. 23, 1990

[30] Foreign Application Priority Data

Mar. 27, 1989 [JP] Japan .................................. 1-34636

[51] Int. Cl.⁵ ............................................. G03B 15/02
[52] U.S. Cl. ...................... 354/126; 354/288; 362/8; 362/18
[58] Field of Search ............... 354/288, 403, 404, 405, 354/406, 407, 408, 409, 187, 189, 126, 127.1, 145.1; 362/8, 18

[56] References Cited

U.S. PATENT DOCUMENTS

| | | | |
|---|---|---|---|
| 4,106,037 | 8/1978 | Nakamura et al. | 354/288 |
| 4,331,405 | 5/1982 | Yamamoto | 354/126 |
| 4,525,046 | 6/1985 | Takoaka et al. | 354/288 |
| 4,796,034 | 1/1989 | Leonard et al. | 354/145.1 |

FOREIGN PATENT DOCUMENTS

| | | |
|---|---|---|
| 3236710 | 4/1982 | Fed. Rep. of Germany . |
| 5645832 | 9/1954 | Japan . |
| 53-17325 | 2/1978 | Japan . |
| 56-162731 | 12/1981 | Japan . |
| 58-157314 | 10/1983 | Japan . |
| 752772 | 7/1956 | United Kingdom . |
| 2060913 | 5/1981 | United Kingdom . |

*Primary Examiner*—L. T. Hix
*Assistant Examiner*—Cassandra C. Spyrou
*Attorney, Agent, or Firm*—Sandler, Greenblum & Bernstein

[57] ABSTRACT

In a camera having a strobe arm on which a strobe light flashing element is provided, the strobe arm is movable between an operating position and a non-operating position. The strobe arm has a substantially arc-shaped surface and is positioned along a circumferential surface of a taking lens when it is located at the non-operating position. Thus, the camera is not enlarged.

18 Claims, 6 Drawing Sheets

FIG. IA
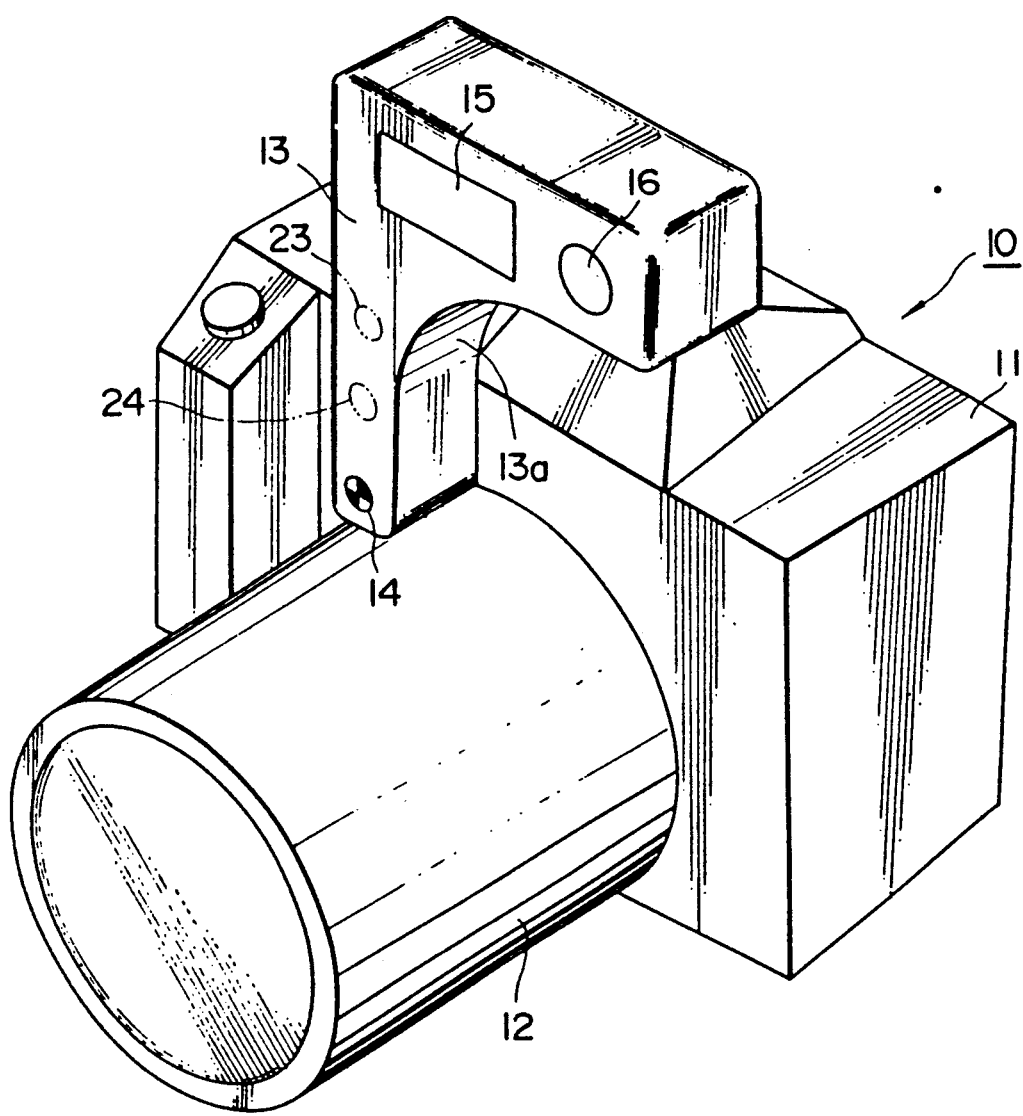

CAMERA PROVIDED WITH A STROBE

BACKGROUND OF THE INVENTION

The present invention relates to a camera with a strobe, more particularly to a camera in which a space around a lens barrel is utilized for locating a strobe arm on which the strobe is mounted.

Recent cameras generally include a strobe, whether they are a compact camera or a single-lens reflex camera. When, however, the light flashing element of the strobe is located near the taking lens, a problem arises in that a so-called red-eye phenomenon is caused. To solve the above problem, various types of cameras have been conventionally proposed, wherein a strobe arm capable of being turned to an accommodating position and to an operating position is attached to a camera body and a strobe light flashing element is mounted on the strobe arm (For example, Japanese Patent Provisional Publication No. Sho 56-162731 and Japanese Utility Model Application Provisional Publication No. Sho 58-157314). This device is based on the idea that the strobe arm is turned to the operating position to keep the strobe light flashing element spaced from the taking lens to prevent the red-eye phenomenon. Since, however, in all of the conventional devices, the strobe arm is mounted on an upper portion of a camera body, there is a problem in that space where the strobe arm is to be stored is difficult to obtain further a camera provided with the conventional strobe device is difficult to properly design and becomes large.

SUMMARY OF THE INVENTION

It is therefore an object of the invention to provide an improved camera which houses a strobe arm comprising a strobe light flashing element mounted on the strobe arm capable of turning between a storage position and an operating position, wherein space for accommodating the strobe arm can be readily obtained and the camera can be properly designed and does not become large.

For this purpose, according to the present invention, there is provided a camera including a strobe light element for emitting light when an object is photographed, said strobe light element is mounted on an arm member arranged to be rotatable about a pivot shaft between at least a non-operating position wherein the arm member is located along a circumferential surface of a taking lens barrel and an operating position wherein the strobe light element is spaced farther from said taking lens barrel.

DESCRIPTION OF THE ACCOMPANYING DRAWINGS

FIG. 1A is a perspective view of one embodiment of a camera according to the present invention wherein the strobe arm is located at an operating position;

DESCRIPTION OF THE EMBODIMENTS

Figure 1B:
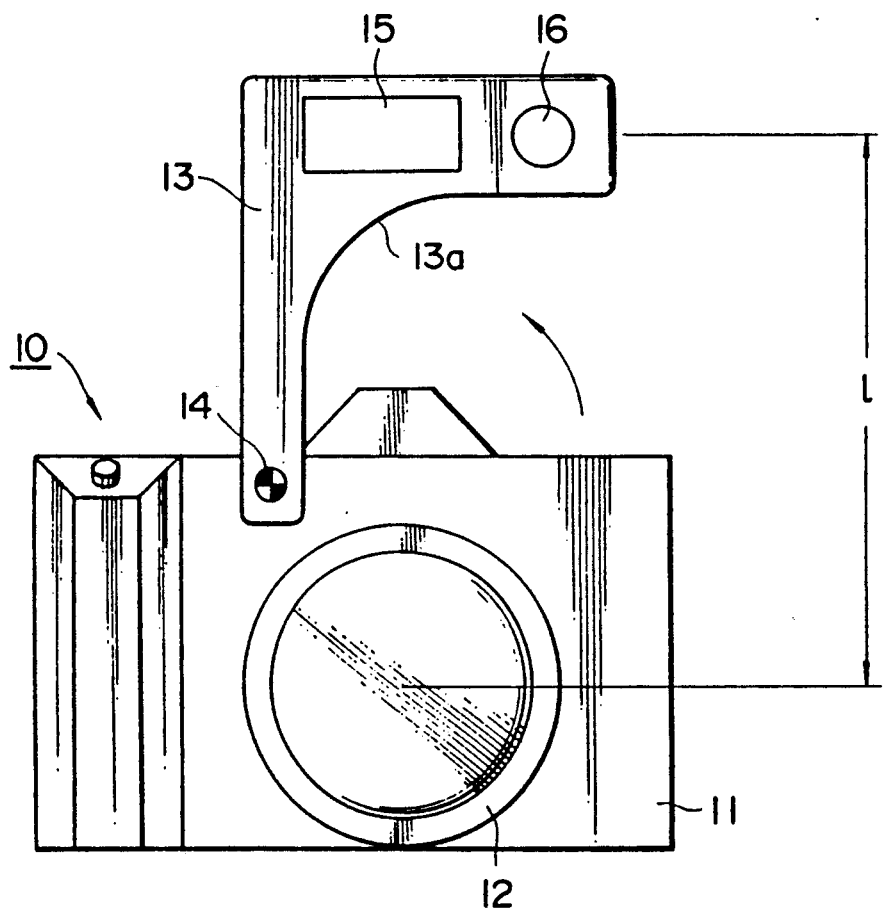
FIG. 1B is a front view of the camera of FIG. 1A.
Figure 2A:
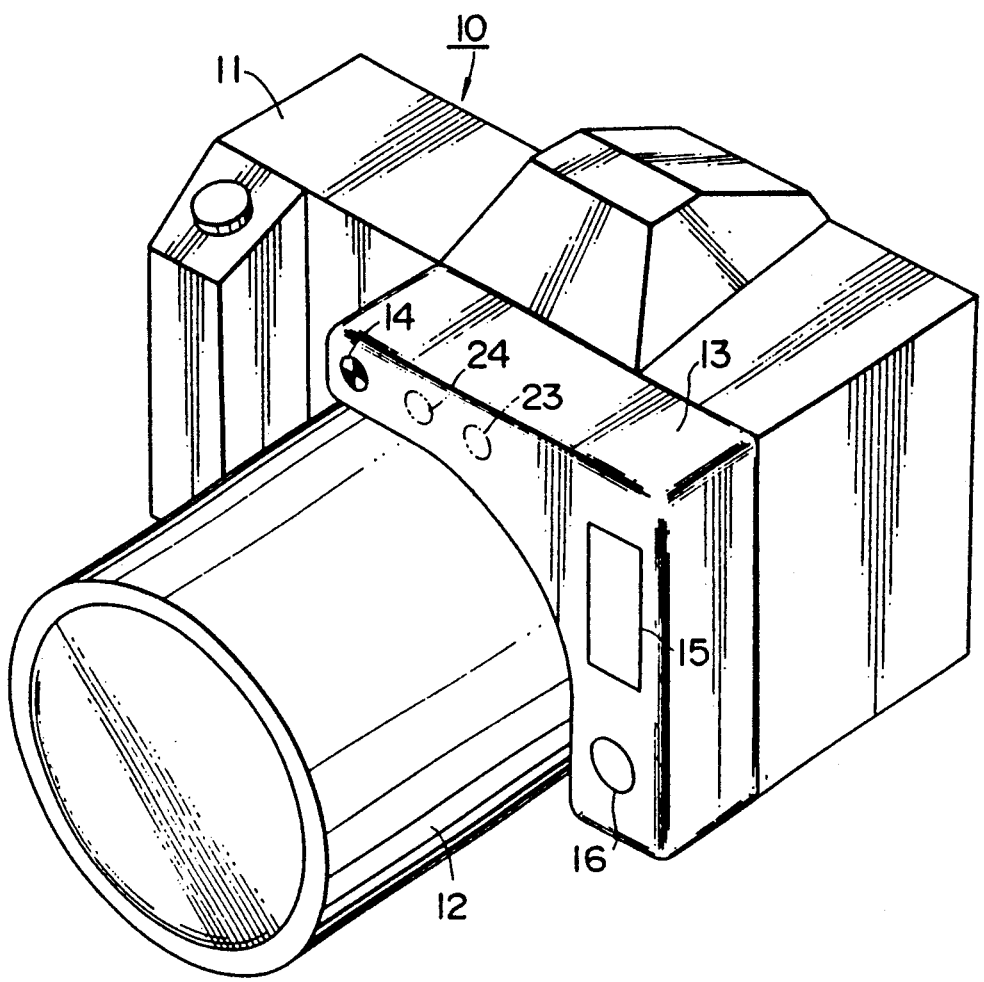
FIG. 2A is a perspective view of the camera of FIG. 1A wherein the strobe arm is located at a storage position.
Figure 2B:
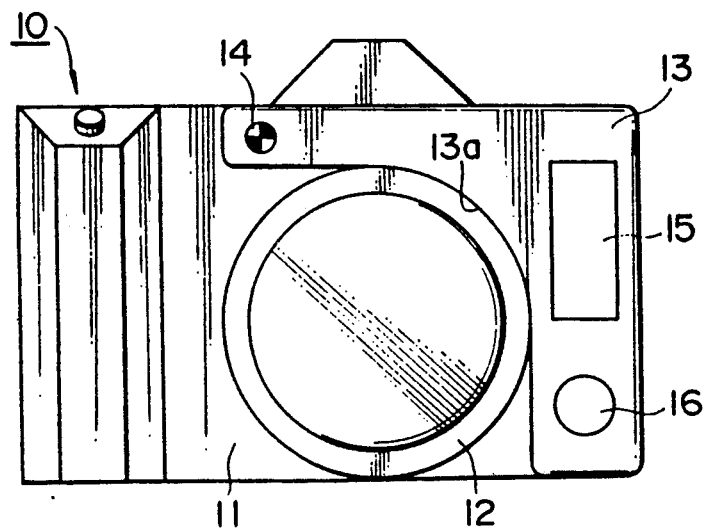
FIG. 2B is a front view of the camera of FIG. 2A.
Figure 2C:
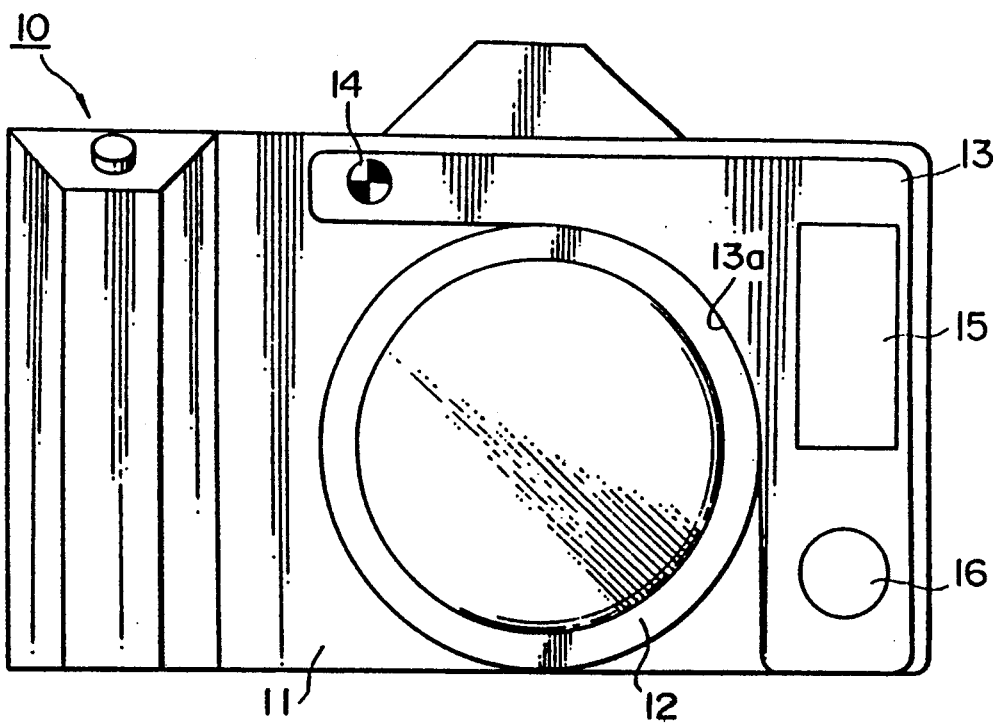
FIG. 2C is a front view of another embodiment of a camera according to the present invention.

Referring to the drawings, an embodiment of the present invention is described hereinafter. FIGS. 1A through 2B show an embodiment of a camera to which the present invention is applied, wherein FIG. 1A and 1B show the operating state of the embodiment and FIGS. 2A and 2B show the stored state thereof. A single-lens reflex camera 10 is provided with a camera body 11 and a taking lens barrel 12. The lens barrel 12 may be detachably attached to the body 11 or may be a fixed type. A strobe arm 13 is mounted at a front left upper portion of the outside of the lens barrel 12 in front of the camera body 11 about a shaft 14. The strobe arm 13 is substantially formed in an L-shape and has an arc-shaped surface 13a defined as the portion thereof along the lens barrel 12 on the side thereof. More specifically, the arc-shaped surface 13a of the strobe arm 13 is in alignment with the lens barrel 12 when the strobe arm 13 is turned to the lens barrel 12 side to be located at the accommodating position. At the time the outside configuration of the strobe arm 13 is made substantially the same as the profile of the camera body 11, as illustrated in FIG. 2A and 2B or is inside the profile of the camera body 11, as illustrated in FIG. 2C.

The strobe arm 13 is provided with a strobe light flashing element 15 and an auxiliary light transmitting element 16 which are located at positions spaced as far as possible from the shaft 14. As known well, the auxiliary light transmitting element 16 is used to emit a contrast pattern when an object to be photographed is located in the dark.

Figure 3:
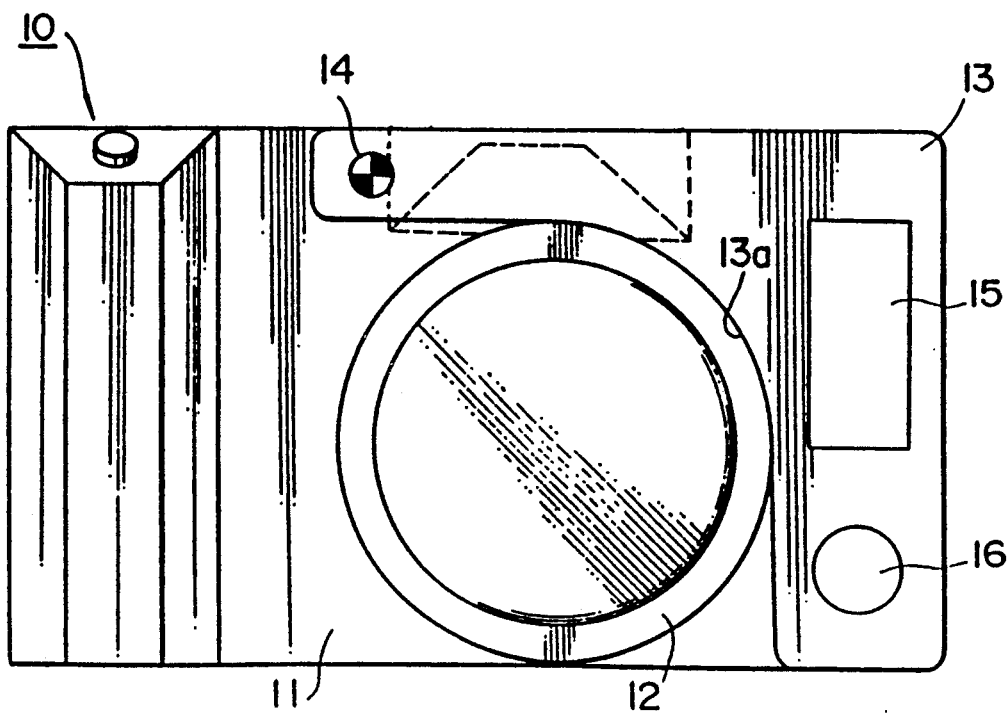
FIG. 3 is a front view of a still another embodiment of a camera according to the present invention.

Therefore, the strobe arm 13 is accommodated along the outer circumferential surface of the lens barrel 12 when it is in an accommodated state shown in FIGS. 2A and 2B. Thus the camera does not give the impression that it is large in size when, however, a strobe is used, the strobe arm 13 is in the operating state wherein the strobe arm 13 is substantially upright, as shown in FIGS. 1A and 1B. Then, the strobe light flashing element 15 and the auxiliary light transmitting element 16 located at positions spaced from the shaft 14 and sufficiently spaced from the optical axis of the taking lens (distance: 1), and thus the red-eye phenomenon can be prevented. Further, light from the strobe light flashing element 15 and the auxiliary light transmitting element 16 are not blocked by the taking lens. Note that when a recently proposed accommodating type pentagonal prism 17 is used in the body 11, the single-lens reflex camera 10 is made substantially box-shaped when the strobe arm 13 is accommodated, whereby the camera 10 is made more compact, as illustrated in FIG. 3.

Figure 4A:
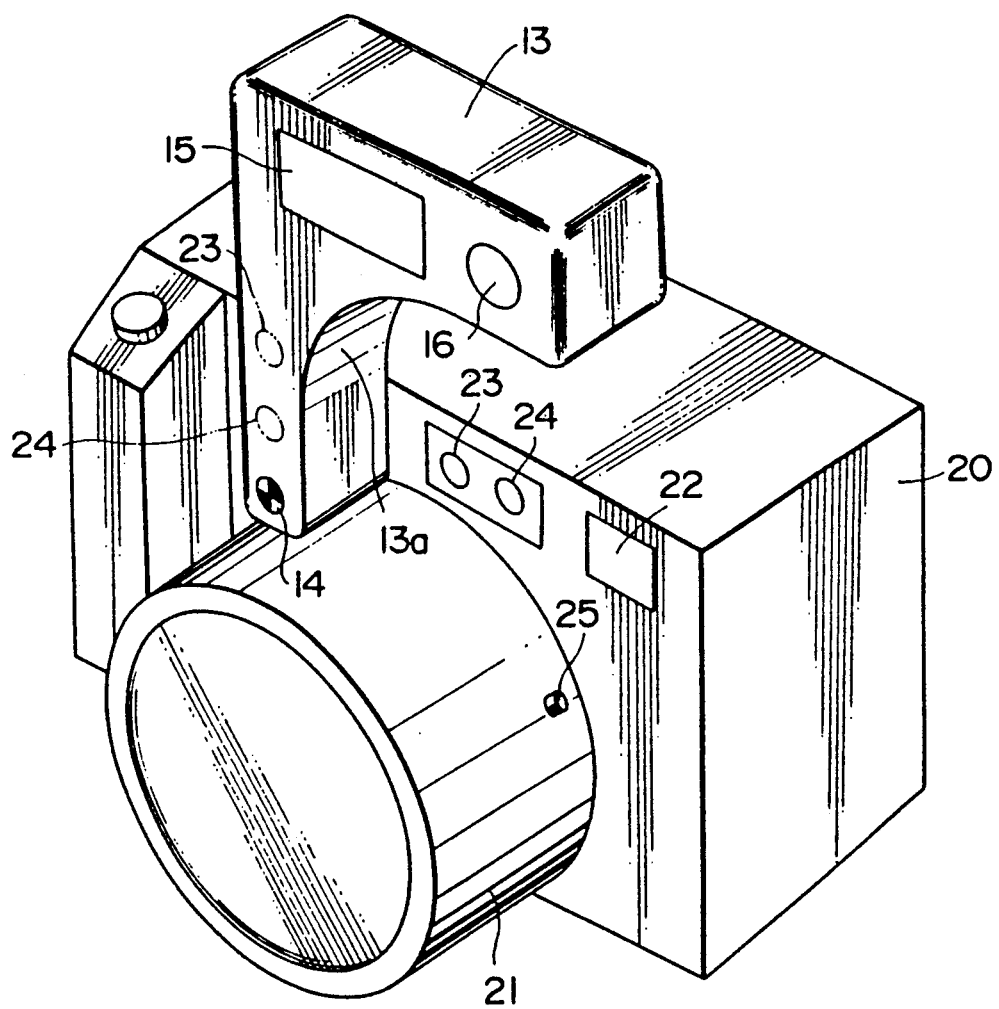
FIG. 4A and 4B are perspective views of still other embodiments of a camera according to the present invention.

FIG. 4A shows another embodiment in which the present invention is applied to a compact camera 20. The compact camera 20 is provided with a finder optical system 22 in addition to a taking lens barrel 21, and is further provided with a triangulation distance measuring device based on the triangulation principle. As known well, the triangulation distance measuring device includes a light transmitting element 23 and a light receiving element 24 when it is of an active type, and a pair of light receiving elements 23 and 24 when it is of a passive type.

In this embodiment, when the strobe arm 13 is on the storage position, the finder optical system 22, the light transmitting element 23 and the light receiving element 24 (or the pair of the light receiving elements 23 and 24) of the triangulation distance measuring device are covered by the strobe arm 13, and when the strobe arm 13 is in an operating state, the finder optical system 22, the light transmitting element 23 and the light receiving element 24 are opposed to the object to be photographed. In this embodiment, a main camera switch 25, which is turned on and off by being depressed by means of the strobe arm 13, can be disposed in the vicinity of the lens-barrel 21 to ensure that the camera is not operated unless the strobe arm 13 is in the operating state, whether the strobe light flashing unit 15 is flashed or not.

Alternatively, as illustrated by two-dot-and-dash lines in FIG. 4A, the strobe arm 13 may be provided with the light projecting element 23 and the light receiving element 24 (or the pair of the light receiving elements 23 and 24) of the triangulation distance measuring device. This arrangement is applicable to the single-lens reflex camera as illustrated in FIGS. 1A and 2A, wherein the pair of light transmitting element 23 and light receiving element 24 are illustrated by two-dot-and-dash lines such as in FIG. 4A. More specifically, although the single-lens reflex camera usually uses a TTL (Through the Lens) type distance measuring device, the triangulation distance measuring device is also applicable to a type of camera in which the taking lens-barrel 12 is fixed. When a passive type triangulation distance measuring device is employed, the direction in which the pair of the light receiving units 23 and 24 are arranged is changed by 90° between the operating position shown in FIG. 1A and the accommodating position shown in FIG. 2A. It is thus possible to measure a distance in a state shown in FIG. 1A and in a state shown in FIG. 2A depending of the property of the object to be photographed.

Figure 4B:
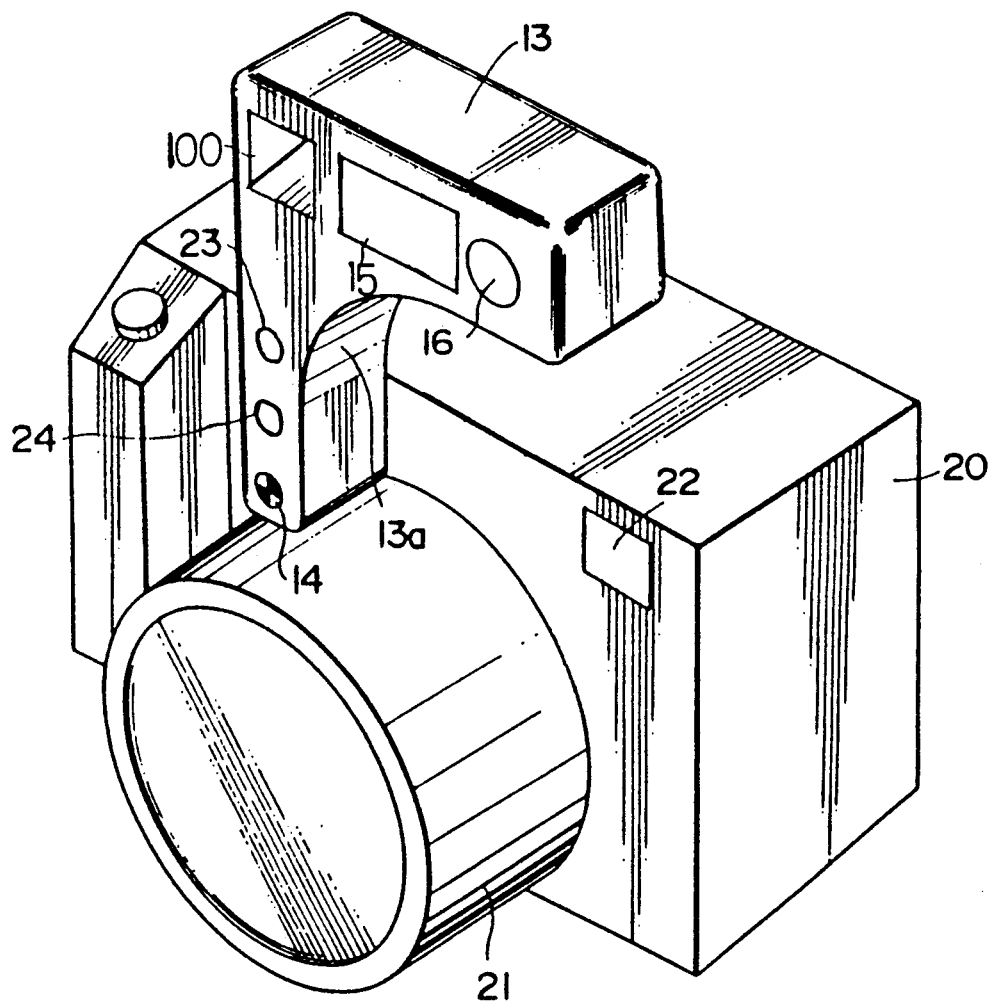

Further, it may be considered that, as illustrated in FIG. 4B, a hole portion 100 is provided on the strobe arm 13 such that the light from the object passed through the hole portion 100 and received by the finder optical system 22 when the arm 13 is in the storage position. In this case, the camera 20 can be used both in a state wherein the strobe arm 13 is spaced from the taking lens barrel 21 and in a state wherein the strobe arm is located along the taking lens barrel 21.

As described above, since a camera provided with a strobe arm according to the present invention uses a space around a taking lens barrel which has not conventionally been used as a space for storing the strobe arm, it is not necessary to make the camera large in size and to make the design thereof unsightly. The strobe arm is provided with an arc-shaped surface to be aligned with the taking lens barrel, whereby the configuration and design of the strobe arm is refined when it is stored. Further, the strobe arm is disposed at the front left upper portion of the camera so that a grip usually disposed at the front left side of the camera does not interfere the strobe arm, whereby the operability of the camera can be improved.

What is claimed is:

1. A camera having a taking lens barrel and including a strobe light element for emitting light when an object is photographed, said strobe light element mounted on an arm member, said arm member rotatable about a pivot shaft between at least a non-operating position wherein said arm member is located along only a portion of a circumferential surface of a taking lens barrel and an operating position wherein said strobe light element is spaced from said taking lens barrel.

2. The camera according to claim 1, wherein said arm member is substantially L-shaped, and further has an arc-shaped surface located along said circumferential surface of said taking lens barrel when said arm member is located at said non-operating position.

3. The camera according to claim 1, wherein said pivot shaft is attached to a front left upper portion of said camera.

4. The camera according to claim 2, wherein the outline of said arm member is substantially identical with the outline of said camera when that said arm member is located at said non-operating position.

5. The camera according to claim 2, wherein the outline of said arm member is positioned inside the outline of said camera in case that said arm member is located at said non-operating position.

6. The camera according to claim 1, which further comprises a pair of light receiving and transmitting elements for a distance measurement based upon the triangulation principle, each of said elements being positioned to face to an object to be photographed when said arm member is located at said operating position.

7. The camera according to claim 6, wherein a main switch of said camera is positioned to be turned on when said arm member is located at said operating position.

8. The camera according to claim 1, wherein said arm member is provided with a pair of light receiving and transmitting elements for distance measurement based upon the triangulation principle.

9. The camera according to claim 1, which further comprises a pentagonal prism arranged to be provided within said camera.

10. A camera having a taking lens barrel including a strobe light element for emitting light when an object is photographed, said strobe light element mounted on an arm member, said arm member rotatable about a pivot shaft substantially parallel to the axis of the lens barrel between at least a non-operating position wherein said arm member is located along a circumferential surface of a taking lens barrel and an operating position wherein said strobe light element is spaced from said taking lens barrel.

11. The camera according to claim 10, wherein said arm member is substantially L-shaped, and further has an arc-shape surface located along said circumferential surface of said taking lens barrel when said arm member is located at said non-operating position.

12. The camera according to claim 10, wherein said pivot shaft is attached to a front upper left portion of said camera.

13. The camera according to claim 11, wherein the outline of said arm member is substantially identical to the outline of said camera when said arm member is located at said non-operating position.

14. The camera according to claim 11, wherein the outline of said arm member is positioned inside the outline of said camera when said arm member is located at said non-operating position.

15. The camera according to claim 10, further comprising a pair of light receiving and transmitting elements for distance measuring based upon the triangulation principle, each of said elements positioned to face an object to be photographed when said arm member is located at said operating position.

16. The camera according to claim 15, wherein a main switch of said camera is positioned to be turned on when said arm member is located at said operating position.

17. The camera according to claim 10, wherein said arm member is provided with a pair of light receiving and transmitting elements for distance measurement based upon the triangulation principle.

18. The camera according to claim 10, further comprising a pentagonal prism arranged to be provided within said camera.

* * * * *